US008175635B2

(12) United States Patent
Deshpande et al.

(10) Patent No.: US 8,175,635 B2
(45) Date of Patent: May 8, 2012

(54) METHODS AND APPARATUS FOR SYSTEM SELECTION IN A MULTIMODE WIRELESS DEVICE (75) Inventors: Manoj M. Deshpande, San Diego, CA (US); Sanjiv Nanda, Ramona, CA (US); Daniel H. Salek, La Jolla, CA (US)

(73) Assignee: Qualcomm Incorporated, San Diego, CA (US)

(*) Notice: Subject to any disclaimer, the term of this patent is extended or adjusted under 35 U.S.C. 154(b) by 740 days.

(21) Appl. No.: 12/251,300

(22) Filed: Oct. 14, 2008

(65) Prior Publication Data

US 2010/0091719 A1    Apr. 15, 2010

(51) Int. Cl.
*H04M 3/00*    (2006.01)
*H04M 1/00*    (2006.01)
*H04W 4/00*    (2009.01)

(52) U.S. Cl. .............. 455/552.1; 455/418; 455/432.1; 455/435.2; 370/338

(58) Field of Classification Search ............ 455/41.2, 455/168.1, 188.1, 418, 422.1, 434, 435.1–435.3, 455/436, 440, 444, 450, 452.1–452.2, 509, 455/512–514, 524–525, 550.1, 552.1, 553.1, 455/557, 420, 432.1–432.3, 448, 456.1, 456.3, 455/456.5–456.6, 556.2, 551; 370/328–331, 370/336–339, 341–345, 437, 480–482, 491
See application file for complete search history.

(56) References Cited

U.S. PATENT DOCUMENTS

| | | | | |
|---|---|---|---|---|
| 7,260,394 | B2 * | 8/2007 | Welnick et al. | 455/432.1 |
| 7,415,088 | B2 * | 8/2008 | Peluso et al. | 375/355 |
| 7,630,711 | B2 * | 12/2009 | Nagaraj et al. | 455/432.1 |
| 7,689,218 | B2 * | 3/2010 | Jiang et al. | 455/435.2 |
| 7,702,329 | B1 * | 4/2010 | Durig et al. | 455/432.1 |
| 2003/0147365 | A1 * | 8/2003 | Terasawa et al. | 370/335 |
| 2005/0130661 | A1 * | 6/2005 | Aerrabotu et al. | 455/437 |
| 2006/0234705 | A1 * | 10/2006 | Oommen | 455/435.3 |
| 2007/0255797 | A1 * | 11/2007 | Dunn et al. | 709/217 |
| 2008/0064393 | A1 * | 3/2008 | Oommen et al. | 455/432.1 |
| 2008/0182615 | A1 * | 7/2008 | Xue et al. | 455/552.1 |

FOREIGN PATENT DOCUMENTS

| | | |
|---|---|---|
| EP | 1740001 A1 | 1/2007 |
| EP | 1885141 A1 | 2/2008 |

OTHER PUBLICATIONS

International Search Report and the Written Opinion—PCT/US2008/088072, International Search Authority—European Patent Office—Jul. 3, 2009.

* cited by examiner

*Primary Examiner* — Meless Zewdu
(74) *Attorney, Agent, or Firm* — Florin Corie; Abdollah Katbab (57) ABSTRACT Methods and apparatus for system selection in a multimode wireless device are disclosed. The method and apparatus afford selection of a wireless communication system access technology from a number of wireless system access technologies supported by a wireless device. Selection is accomplished by storing identification information concerning access technologies pertaining to a first group of wireless system access technologies, such as 3GPP2, in a search database, which concerns the priority of access technologies pertaining to another group of access technologies, such as 3GPP. Selection of a preferred wireless communication system access technology from one of the wireless access technology groups is then based on the identification information stored in the search database.

50 Claims, 7 Drawing Sheets

| | PLMN | Access Technology Identifier (ATID) |
|---|---|---|
| 1 | 1st PLMN | 1st PLMN ATID + Extension bit(s) |
| 2 | 2nd PLMN | 2nd PLMN ATID + Extension bit(s) |
| ... | ... | ... |
| 8 | 8th PLMN | 8th PLMN ATID + Extension bit(s) |
| N | Nth PLMN | Nth PLMN ATID + Extension bit(s) |

High Priority ↑ Low Priority

*Fig. 3*

| | SID | NID | MCC | MNC |
|---|---|---|---|---|
| 1 | S1 | N1 | C1 | W1 |
| 2 | S1 | N2 | C1 | W1 |
| ... | ... | ... | ... | ... |
| N | Sn | N1 | Cm | W1 |

PRL 702

704

Acquisition Table:

| INDEX | Network Type | Channel Block |
|---|---|---|
| 0 | Cellular CDMA (Standard Channels) | B |
| 1 | Cellular CDMA (Standard Channels) | A |
| 2 | Cellular Analog | A |
| 3 | Cellular Analog | B |
| 4 | PCS CDMA (Using Channels) | 425 |
| 5 | PCS CDMA (Using Blocks) | F |

706

System Table — Permitted Systems:

| | Carrier-System SID/NID | Selection Pref. | Roaming Indicator | Acquisition Index |
|---|---|---|---|---|
| | SID/NID | First | off | 0 |
| | SID/NID | Second | on | 1 |
| | SID/NID | Second | on | 2 |
| | SID/NID | Third | flashing | 4 |

SID/NID to MCC/MNC Mapping Table 708

| | SID | NID | MCC | MNC |
|---|---|---|---|---|
| 1 | S1 | N1 | 310 | 2 |

PLMN List 710

| | MCC | MNC | Access Technology |
|---|---|---|---|
| 1 | 310 | 1 | LTE (410) |
| 2 | 310 | 2 | 3GPP2 (e.g., 1xEVDO 412) |
| 3 | 310 | 3 | LTE (414) |

High Priority ↑ Low Priority

METHODS AND APPARATUS FOR SYSTEM SELECTION IN A MULTIMODE WIRELESS DEVICE

BACKGROUND

1. Field

The present disclosure relates to methods and apparatus for system selection in a multimode wireless device; and more particularly to system selection in a multimode wireless device based on translation of database information between different technologies.

2. Background

With the deployment of a multitude of wireless technologies worldwide and support for these technologies in mobile multimode devices or user equipment, there is a growing need for seamless system selection toward the goal of global roaming. Furthermore, any particular geographic region may support mixed technologies and networks, such as 3rd Generation Partnership Project (3GPP) and $3^{rd}$ Generation Partnership Project 2 (3GPP2) technologies.

A mobile multimode device that supports mixed technologies may include multiple databases that are used in selecting optimal networks within a technology. As an example, for $3^{rd}$ Generation Partnership Project 2 (i.e., 3GPP2) technologies, such as certain CDMA2000 (Code Division Multiple Access 2000) networks, a Preferred Roaming List (PRL) database which is stored at the mobile device provides information about which system/network from 3GPP2 technologies is preferred in a geographic region for that device. Whether predetermined or programmed via Over-the-air (OTA) Management protocols, the PRL contains information about the preferred networks and the order in which they should be selected for the user. PRLs for 3GPP2 technologies may be structured to have a table associated with each geographical region, which in turn contains a list of system descriptions keyed by system identifier/network identifier (SID/NID) pairs and associated with an acquisition index. The acquisition index is used as a pointer to an acquisition table AT which contains an indexed list of RF channels for channel acquisition purposes in the related system.

On the other hand for 3GPP technologies, such as Global System for Mobile (GSM) and UMTS Terrestrial Radio Access (UTRA), a differently structured database list of preferred networks, termed Public Land Mobile Networks (PLMNs), is stored in a Subscriber Identity Module (SIM) or Universal Subscriber Identity Module (USIM) of the mobile device. The PLMNs in the database include a Mobile Network Code (MNC) that is used in combination with a Mobile Country Code (MCC) (also known as a "MCC/MNC tuple") to uniquely identify a service operator using a 3GPP technology, such as GSM and UMTS public land mobile networks.

When roaming through geographical locations, it is desirable that a multimode device seamlessly select the best available system, particularly when roaming across areas with different available access technologies (e.g., 3GPP and 3GPP2). Accordingly, the management of access technology selection for multimode roaming between existing access technologies, as well as possible future access technologies, that effects a more seamless and efficient system selection among the access technologies would be beneficial.

SUMMARY

According to a disclosed, a method for selecting a wireless communication system access technology from a plurality of wireless system access technologies supported by a wireless device is provided. The method includes storing identification information concerning access technologies pertaining to a first group of wireless system access technologies of the plurality in a first search database concerning priority of access technologies pertaining to a second group of wireless system access technologies of the plurality. The method also includes selecting a preferred wireless communication system access technology from one of the first group of wireless system access technologies and the second group of wireless system access technologies based on at least the identification information stored in the first search database.

In another aspect, an apparatus for selecting a wireless communication system access technology from a plurality of wireless system access technologies supported by a wireless device is disclosed. The apparatus includes a first search database. Additionally, the apparatus features a selection controller configured to store identification information concerning access technologies pertaining to a first group of wireless system access technologies of the plurality in the first search database concerning priority of access technologies pertaining to a second group of wireless system access technologies of the plurality. The selection controller is also configured to select a preferred wireless communication system access technology from one of the first group of wireless system access technologies and the second group of wireless system access technologies based on at least the identification information stored in the first search database.

In yet another aspect, an apparatus for selecting a wireless communication system access technology from a plurality of wireless system access technologies supported by a wireless device is disclosed. According to this aspect, the apparatus includes a memory storing instructions executable by at least one processor. Also, the apparatus includes at least one processor configured to execute the instructions stored in the memory in order to store identification information concerning access technologies pertaining to a first group of wireless system access technologies of the plurality in a first search database concerning priority of access technologies pertaining to a second group of wireless system access technologies of the plurality. The at least one processor is also configured to execute instructions stored in the memory in order to select a preferred wireless communication system access technology from one of the first group of wireless system access technologies and the second group of wireless system access technologies based on at least the identification information stored in the first search database.

According to yet another aspect, a computer program product, comprising a computer-readable medium is disclosed. The medium includes code for causing a computer to store identification information concerning access technologies pertaining to a first group of wireless system access technologies of the plurality in a first search database concerning priority of access technologies pertaining to a second group of wireless system access technologies of the plurality. The medium also includes code for causing a computer to select a preferred wireless communication system access technology from one of the first group of wireless system access technologies and the second group of wireless system access technologies based on at least the identification information stored in the first search database.

According to still one other aspect, an apparatus for selecting a wireless communication system access technology from a plurality of wireless system access technologies supported by a wireless device is disclosed. The apparatus includes means for storing identification information concerning access technologies pertaining to a first group of wireless system access technologies of the plurality in a first search database concerning priority of access technologies pertaining to a second group of wireless system access technologies of the plurality. Also included in the apparatus are means for selecting a preferred wireless communication system access technology from one of the first group of wireless system access technologies and the second group of wireless system access technologies based on at least the identification information stored in the first search database.

DETAILED DESCRIPTION

The presently disclosed methods and apparatus provide differentiation by requiring minimal changes to the existing standards and ensure backward compatibility. In particular, the disclosed methods and apparatus translate network identities across different cellular technologies such as 3GPP and 3GPP2. These translations afford an operator the ability to specify total order regarding the preference of the cellular networks. A mobile device is then able to sort the available cellular networks in correct priority order and select the best system. This invention will assist the multimode device to select the best available wireless technology. Further this invention assists the home carrier to ensure efficient and consistent system selection experience to its subscribers worldwide. This invention enables the carrier to express complex roaming relationships while ensuring backward compatibility by building on the existing 3GPP and 3GPP2 system selection mechanisms.

Figure 1:
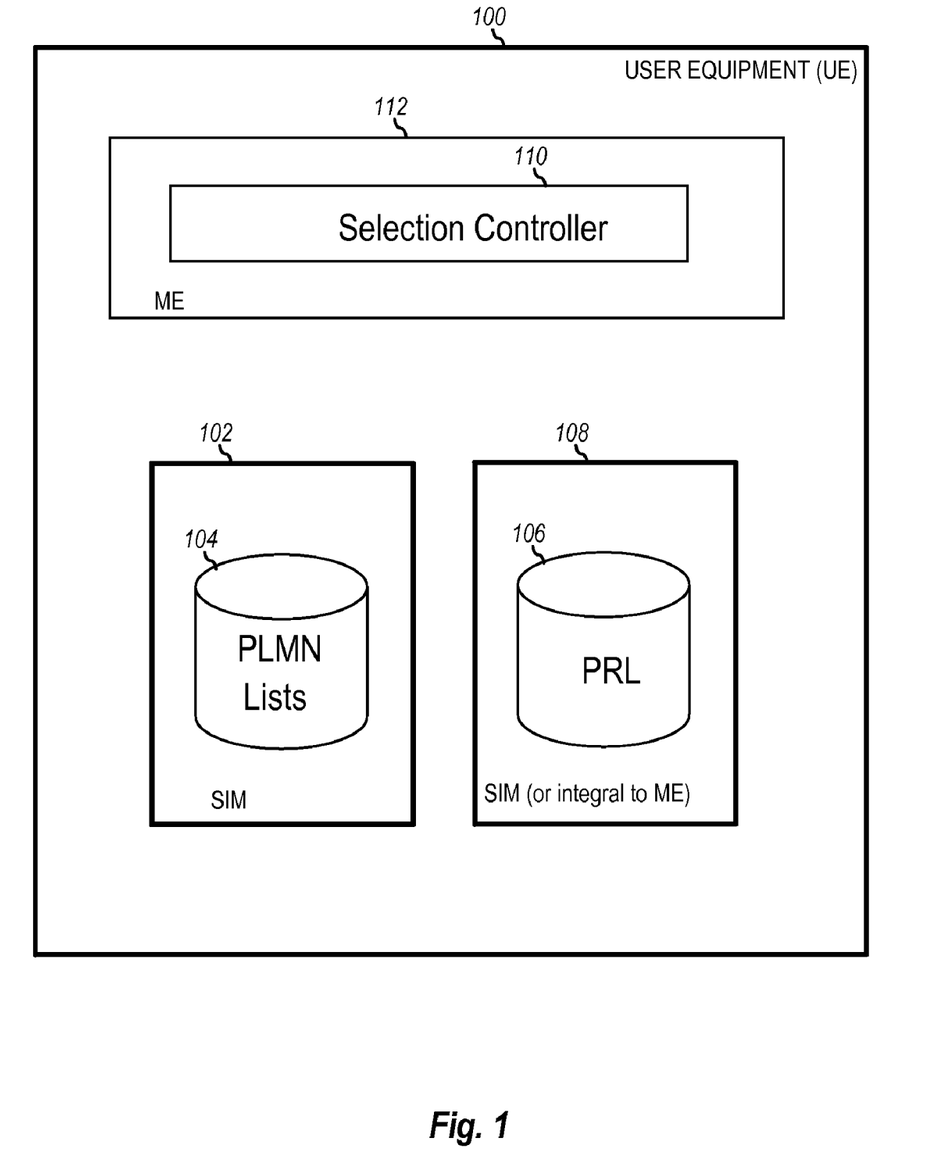
FIG. 1 illustrates a block diagram of an exemplary multimode user equipment (UE) or other mobile device.

FIG. 1 illustrates a block diagram of an exemplary multimode user equipment (UE) or other mobile device. The device 100 includes a SIM or Universal SIM (USIM) 102 containing a database 104 storing the list of PLMNs used for selection of a system or network within 3GPP technologies, in particular. It is noted that the PLMN lists may be predetermined and provided in the SIM 102 prior to distribution of the UE 100, and may also be updated OTA using SIM toolkit and SMS. Similarly, the device 100, being a multimode device, may also include a database 106 storing a PRL for use in selecting between various 3GPP2 technologies. A default PRL may provided in the UE 100 prior to distribution, programmed at the point of sales using service programming tools, or updated OTA using OTASP, as examples. The PRL database 106 may be located in a SIM 108 or RUIM (Removable Subscriber Identity Module) or may alternatively be integral to the hardware or mobile equipment (ME) of the UE 100.

UE 100 may also include a selection controller (SC) 110 that controls the selection of the particular network/service and access technology. According to an aspect, SC 110 may be part of the hardware or mobile equipment (ME) 112, whether that be as a separate controller or as software or firmware executable by a processor, such as a Digital Signal Processor (DSP) or microprocessor in the UE 100. The operation of SC 110 and how it affects system selection will be described in further detail to follow.

In order to manage the selection across multiple technologies (e.g., 3GPP and 3GPP2), the present disclosure includes methods and apparatus that utilize existing mechanisms to manage PRL and PLMN lists for system selection. According to an aspect, one or more of the search databases may be extended with further information that cross-references or translates to the other databases. In this way, one search database may be utilized during selection of the best technology and system/network within the technology for efficient system selection by consulting one database instead of multiple databases.

Figure 2:
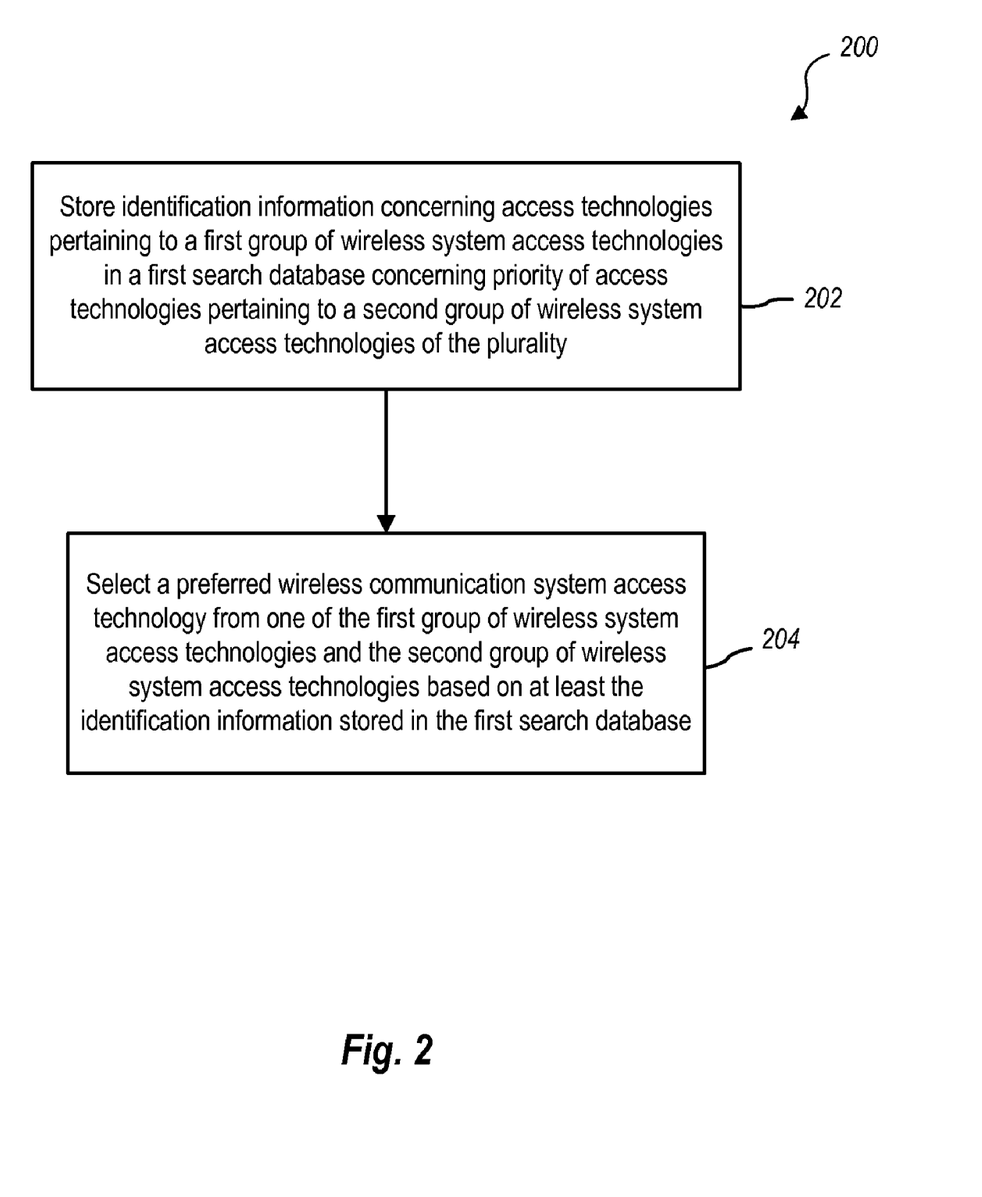
FIG. 2 illustrates a flow diagram of an exemplary method for use in system selection with the device of FIG. 1.

As an example, FIG. 2 illustrates an exemplary method 200 for system selection within a user device having two or more search databases (e.g., PRL and PLMN lists). In particular, method 200 effects the selection of a wireless communication system access technology from a plurality of wireless system access technologies supported by a wireless device, such as device 100 in FIG. 1. Method 200 includes a first block 202 where identification information concerning access technologies pertaining to a first group of wireless system access technologies, (e.g., a 3GPP2 group of technologies), is stored in a first search database pertaining to another second group of technologies (e.g., a list of PLMNs for 3GPP technologies). As an example, the identification information may be comprised of an extension bit or bits pertaining to or identifying each network or system within the first group of 3GPP2 access technologies. Thus, in this example, the first search database would be a list of PLMNs and concern the priority of access technologies pertaining to a second group of wireless system access technologies (i.e., 3GPP technologies). It is noted that this is merely one implementation and that instead of extending a list of PLMNs with identification information about 3GPP2 technologies, as an alternative, a PRL list could be extended with identification information about 3GPP technologies, as an example. Thus, the first and second groups, for purposes of FIG. 2, could be respective ones of 3GPP, 3GPP2, or any other suitable technology groups, and the first and second databases may correspond to search database structures pertinent to whatever technology group the database pertains (e.g., PLMN for 3GPP, PRL for 3GPP2, etc.).

Figure 3:
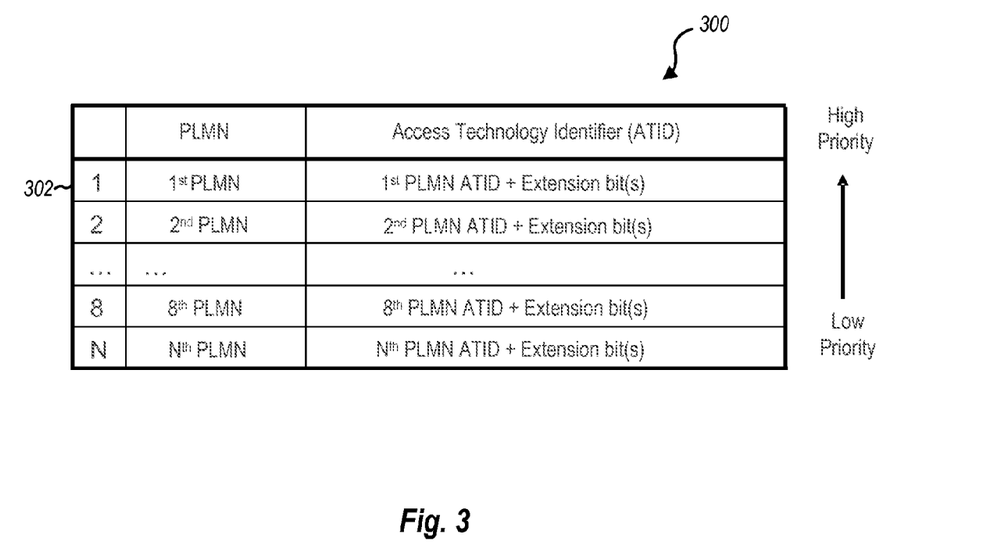
FIG. 3 illustrates at least a portion of an exemplary PLMN list structure 300 that may be stored in a search database, such as database 104 in FIG. 1.

According to a particular example, the extension bit or bits may be added to Access Technology Identifiers (ATIDs) associated with PLMNs in the list of PLMNs stored in a search database. As an example, FIG. 3 illustrates at least a portion of an exemplary PLMN list structure 300 that may be stored in a search database, such as database 104 in FIG. 1. The list structure 300 includes a priority numbering or ordering where the list is from highest to lowest priority from entries 1 through some number N. Each entry in the list 300 (e.g., first entry 302) entry corresponds to a PLMN that may be selected for 3GPP technologies (e.g., the "first group of wireless system access technologies" as described above.). In one example, a single bit may extend or add to one or more of the ATIDs in list 300 in order to indicate support of another access technology group, such as 3GPP2 or WiMax, as examples. Furthermore, a single bit may be used to indicate support of the wireless access technology group (e.g., 3GPP2). As an alternative, multiple bits may be added to an ATID in the list 300 in order to provide further information about particular wireless access systems or networks within the wireless access technology group. For example, if 3GPP2 is supported, the additional bits may indicate technologies such as cdma2000 or EV DO are supported, as merely examples in the instance of a 3GPP2 group of technologies.

Turning back to FIG. 2, after establishing the extension to the first search database in block 202, flow proceeds to block 204. At this block a preferred wireless communication system access technology from one of the first group of wireless system access technologies and the second group of wireless system access technologies is then selected based on the identification information stored in the search database. In other words, the first database becomes a primary search database. For example, given the list of FIG. 3, a selection controller (e.g., SC 110 in FIG. 1) may use the PLMN list 300 to determine either a 3GPP technology from entries extant in the PLMN list or a 3GPP2 technology based on the extension bit(s) added to the ATID information. It is noted that a selection controller or similar functional module may use the extension information in the PLMN list to then determine whether to search for a 3GPP2 network or system based on the extension of the ATID in an aspect. The 3GPP2 systems may then be searched by referring to the PRL. Furthermore, it is contemplated in this scenario that if a conflict arises between the best 3GPP system found and the best 3GPP2 system found, that this conflict may be resolved based on a predetermined priority either to the PLMN list or the PRL.

According to another aspect, it is contemplated that with the structure of the PLMN list 300 in FIG. 3, that the PRL could be eliminated if additional bits are used with the extension to the PLMN ATIDs. Accordingly, a selection controller could determine which is the best 3GPP2 system to search for when the device is roaming and would be configured to know which 3GPP2 system is preferable.

In yet another aspect, it is contemplated that in the example of extending the search database storing the PLMN list such that both 3GPP and 3GPP2 systems (or other technologies such as WiMax) may be identified by MCC/MNC tuples for identification. Accordingly, an operator of a 3GPP2 system would utilize MCC/MNC for system identification. It is further contemplated in connection with this usage that 3GPP2 networks could be adapted to broadcast MCC and MNC information fields in an Extended System Parameter Message (ESPM), and further that the PRL would include MCC/MNC in system records within the search database in a user equipment (UE). In an example, the PRL could issue MCC/MNC of the best 3GPP2 system found in a geographical region to a selection controller in a UE. In turn, the selection controller would then consult the primary search database such as PLMN database for the PLMN list to resolve priorities among 3GPP and 3GPP2 (or WiMax) systems.

As mentioned above, it is contemplated that 3GPP2 networks, for example, could be adapted to broadcast MCC and MNC information fields in an Extended System Parameter Message (ESPM) or equivalent, as wells as the PRLs including MCC/MNC in system records within the search database in a user equipment (UE). However, if not all operators of 3GPP2 networks broadcast MCC/MNC information, or the PRL is incomplete in this regard, situations could arise where selection of the best available or preferred technology (e.g., choosing between 3GPP or 3GPP2 technologies) may not be able to be completed.

Figure 4:
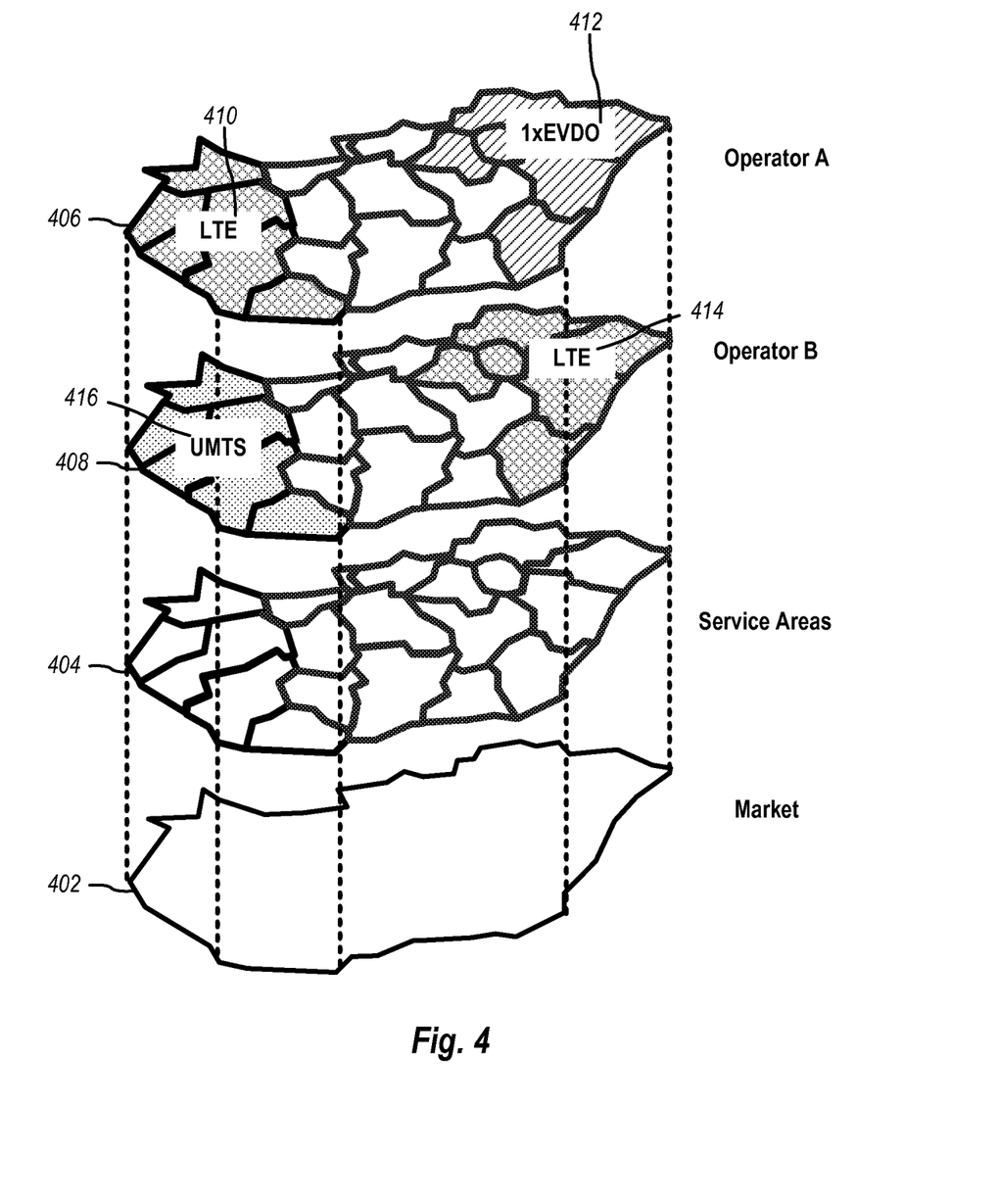
FIG. 4 illustrates an example of various levels of service areas and operators' services over a singular geographical area or market

For purposes of illustration, FIG. 4 shows various levels of service areas and operators' services over a singular geographical area or market. Within a market 400 and various service areas 402 in the market 400, an Operator A might offer LTE in the West (410) and 1xEVDO in the east (412) as illustrated by level 406. Another operator Operator B might offer LTE (414) in the East and UMTS (416) in the West as illustrated by layer 408. Assuming LTE is preferred to 1xEVDO in terms of PLMN priority in a UE subscribing to Operator A, when the UE subscriber travels to the East, Operator B's LTE network will be selected rather than Operator A's EV DO network if the MCC/MNC information is missing. In such case, however, the access technology preference (i.e., Operator A's EV DO network of a different access technology group 3GPP2) is not selected.

In order to remedy the situation above, in another aspect, a UE, and more particularly a selection controller may be further configured to arbitrate among the databases (e.g., PRL and PLMN lists) to select among the preferred system or network from multiple wireless access technologies (e.g., 3GPP and 3GPP2). In particular, the disclosed apparatus and methods effect mapping of identifiers associated with system access technologies for a first group of wireless system access technologies (e.g., SID/NID for 3GPP2 access technologies) to second identifiers associated with the second group of wireless system access technologies (e.g., MCC/MNC for 3GPP technologies).

Figure 5:
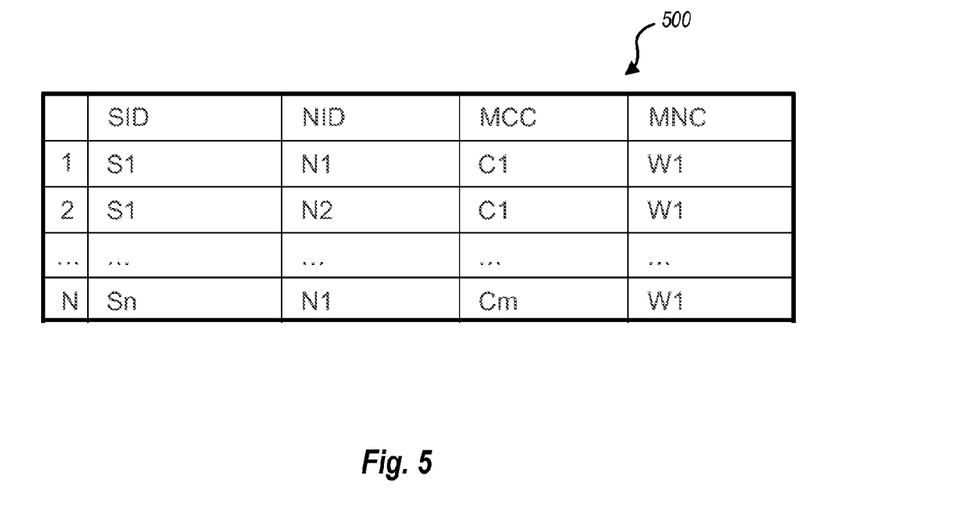
FIG. 5 illustrates at least a portion of an exemplary mapping table to map or translate SID/NID identifiers to MCC/MNC identifiers.

As an example of such mapping, FIG. 5 illustrates a mapping table 500 that correlates or maps SID/NID combinations to an MCC/MNC pair. As illustrated, each of the numbered row entries (e.g., row entries 1 through N) in table 500 correspond to a respective network or systems having an associated SID and/or NID (e.g., S1, N2). Each row then correlates the SID/NID to an associated MCC/MNC values (e.g., C1, W1). It is noted that this table 500 may be stored within the UE in the PRL database or corresponding SIM, the PLMN lists database or corresponding SIM, or another memory or database in communication with the selection controller. It is further noted that table 500 may be constructed by a particular carrier and either included with the UE or programmed or updated via OTA communication (e.g., OTASP) from either a 3GPP operator or 3GPP2 operator.

Figure 6:
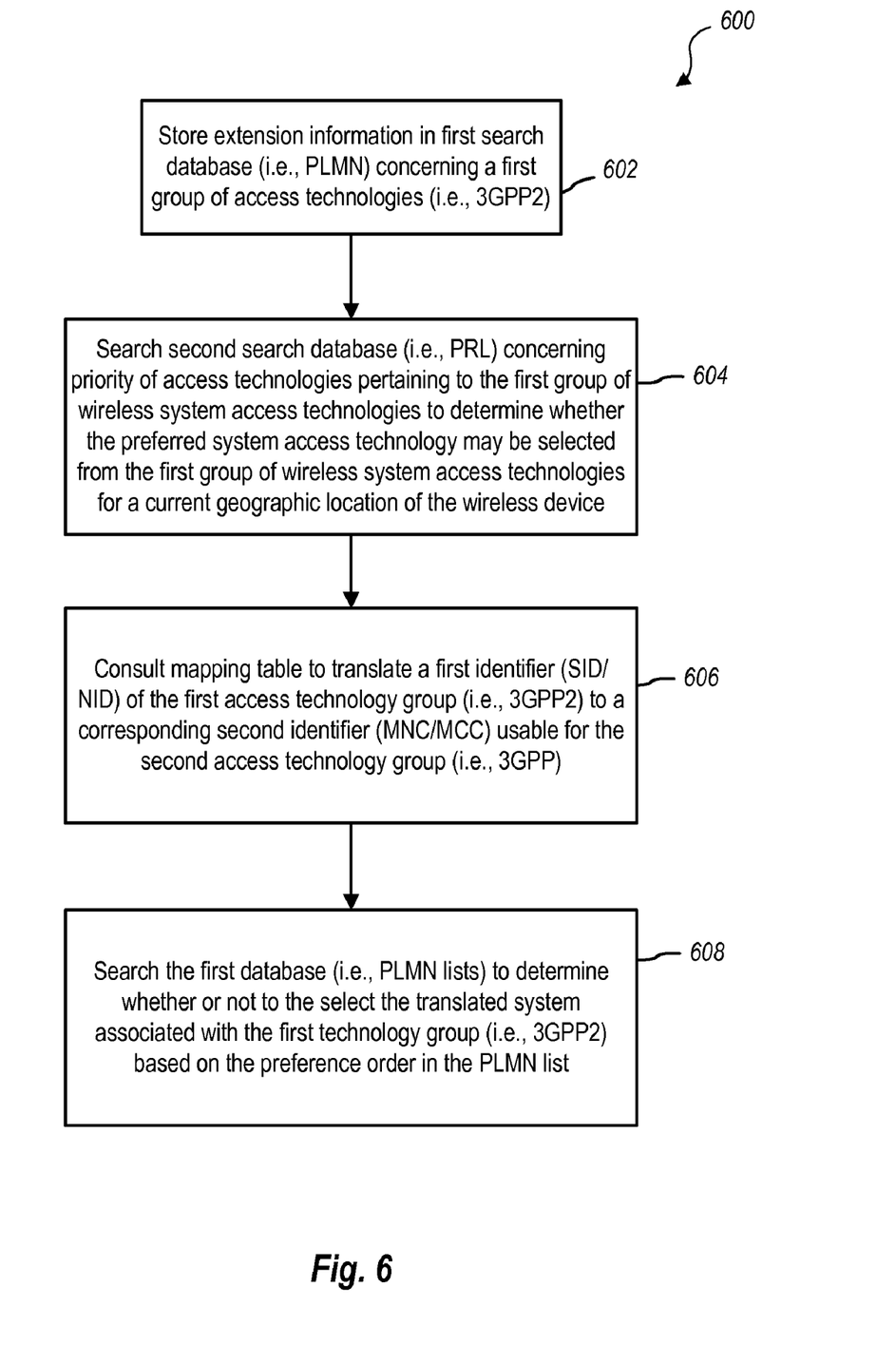
FIG. 6 illustrates a flow diagram of another exemplary method for use in system selection with the device of FIG. 1.

Assuming an example where ATIDs of the PLMN lists have been extended to support 3GPP2, the PLMN list will therefore include 3GPP2 operators that may use MCC/MNC. FIG. 6 illustrates an exemplary method 600 that may be effected by a selection controller (e.g., SC 110 in FIG. 1) to determine selection of a wireless access technology. In this particular example, it is assumed that a first database pertaining to a second group of technologies (i.e., 3GPP) have been extended (i.e., PLMN list ATIDs are extended), similar to methods disclosed previously herein. Accordingly, method 600 includes storing extension information in first search database (i.e., PLMN) concerning a first group of access technologies (i.e., 3GPP2) as illustrated by block 602.

After the operation of block 602, flow proceeds to block 604 where a second search database (i.e., the PRL) concerning at least priority of access technologies pertaining to the first group of wireless system access technologies (i.e., 3GPP2) is searched or consulted in order to determine whether the best or preferred system access technology within the first group (i.e., 3GPP2) supported in the particular geographic location over which the UE is currently located is to be selected. The processes of block 604 may be implemented by a selection controller (e.g. SC 110) or other similar device or functional module. It is noted that the database of these first group technologies (i.e., the PRL for 3GPP2) may either have identification based on MCC/MNC or SID/NID.

It is noted that if the MCC/MNC is known either from the PRL or the PLMN databases, selection may be made of the determined preferred access technology based on the operations in block 604. In the case where the MCC/MNC is not available from the PRL or PLMN databases, the method 600 is then configured to consult the mapping table 500 to translate the SID/NID of the first access technology group (i.e., 3GPP2) to a corresponding MNC/MCC pair usable for the second access technology group (i.e., 3GPP) as illustrated by block 606. The selection controller may then search the PLMN lists to determine whether to select the translated 3GPP2 based on the preference order in the PLMN lists as shown in block 608, which is similar to block 204 illustrated in FIG. 2. It is noted that the processes of blocks 606 and 608 may effected by SC 110 or similar device or functional module.

Figure 7:
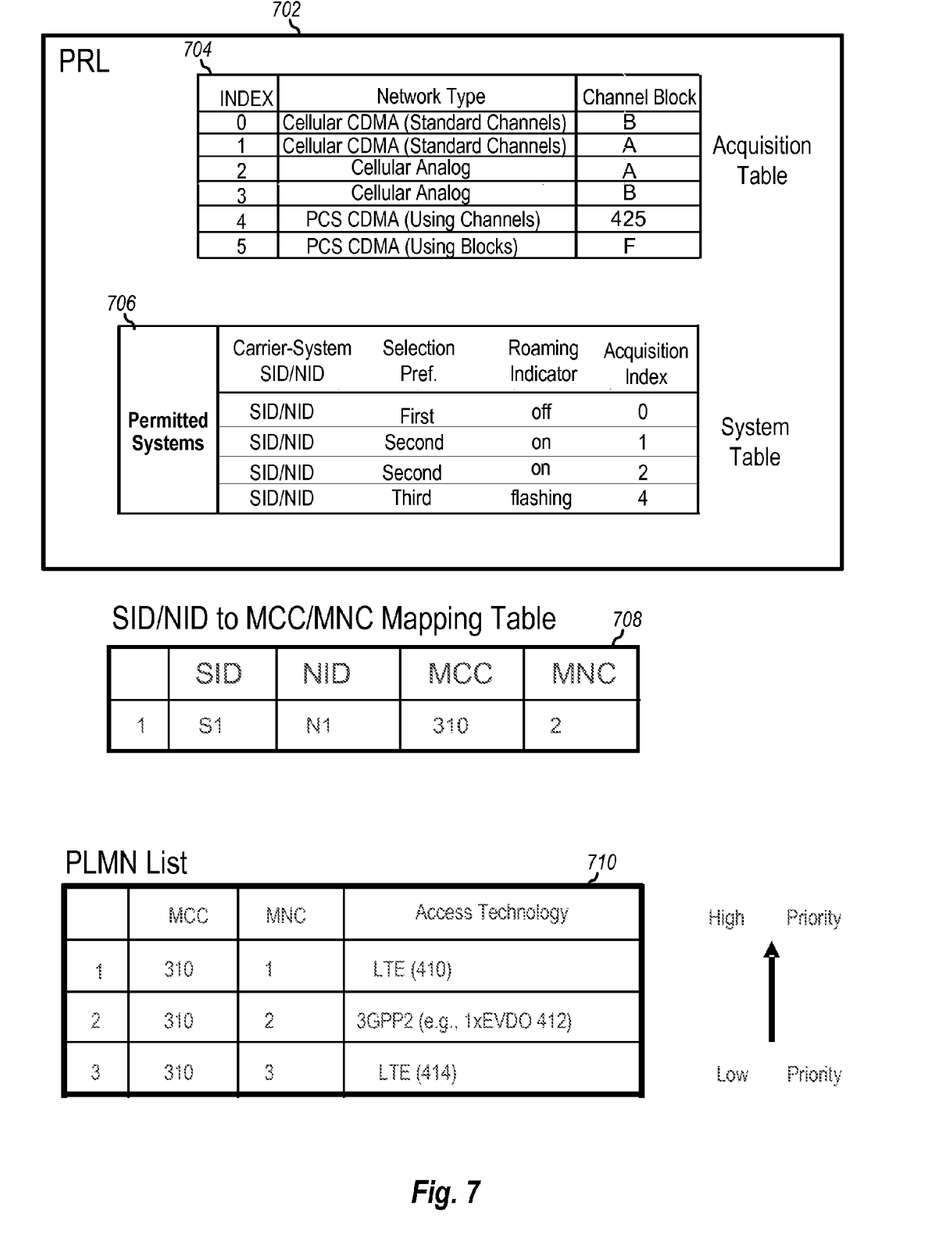
FIG. 7 shows a PRL, PLMN list and mapping table illustrating an example of system selection according to the present disclosure.

Referring back to the example in the illustration of FIG. 4, and in light of the methodology of FIG. 6, when a UE subscriber of Operator A travels to the Eastern service areas, a PRL in the UE may be consulted to determine which network or system is preferred as shown by the exemplary PRL 702 in FIG. 7. In the given example, a selection controller would consult the Acquisition table 704 and System Table 706 to determine the base 3GPP2 system at the particular geographical location, which is the "East" in this particular example (thus the particular System Table 706 would be pertinent to this geographical location only). Since an Acquisition index of 1 would be of higher preference in this particular example, a cellular CDMA technology (i.e., a 3GPP2 technology) is to be selected over other network types when the roaming indicator is on.

If the MCC/MNC is not known in the PLMN list, which is extended to include 3GPP2 information, the selection controller then consults SID/NID to MCC/MNC mapping table 708 to translate the SID/NID S1 and N1 to the MCC/MNC of 310/2. Based on this information, when the selection controller refers to the PLMN list 710 for selection of the preferred network or system, it may be seen that the MCC/MNC 310/2 for the East area corresponding to a 3GPP2 technology (e.g., 1xEVDO 414 as may be seen in FIG. 4) has preference over the LTE 416 of Operator B in the same geographic "East" locale. Accordingly, the preferred 3GPP2 access technology will be selected, thus correcting the scenario presented above in the discussion of the example of FIG. 4.

It is noted that in the case of further conflicts between the PRL and the PLMN, as an example, additional rules such as a PRL override of PLMN priority may be utilized for 3GPP2 systems. Also, it is contemplated that an additional triage database (not shown) may be constructed to base an order for service on both MCC/MNC and SID/NID pairs when 3GPP2 roaming partners do not have a correlative MCC/MNC.

Figure 8:
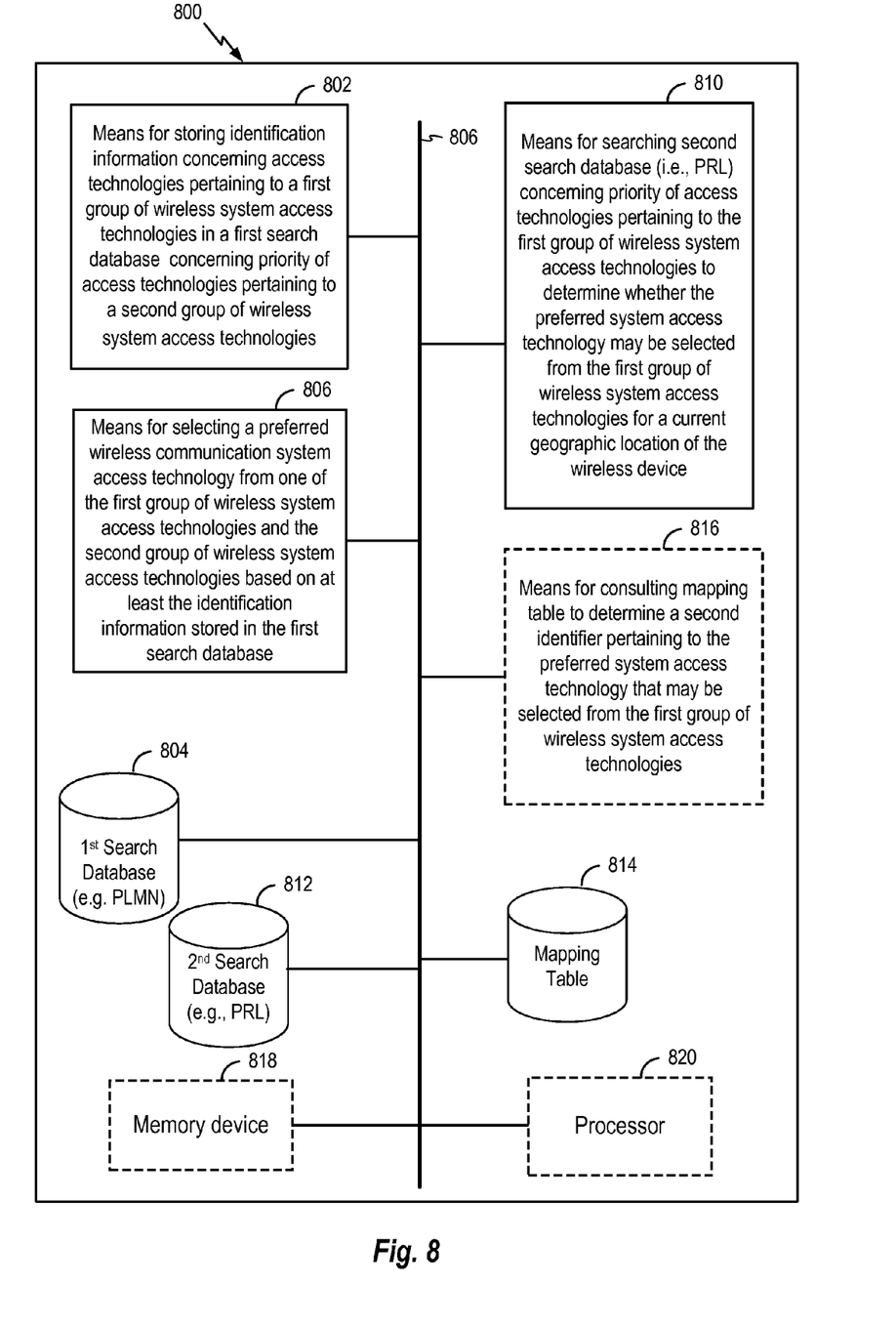
FIG. 8 illustrates an apparatus for use in multimode user equipment (UE) or other mobile device to perform system selection.

FIG. 8 illustrates an apparatus 800 for use in multimode user equipment (UE) or other mobile device to perform system selection. The apparatus 800, which may be implemented in a UE or mobile device, for example, includes a module 802 for storing identification information concerning priority of access technologies pertaining to a first group of wireless system access technologies (e.g., 3GPP2) in a first search database 804 concerning priority of access technologies pertaining to a second group of wireless system access technologies (e.g., 3GPP). It is noted that information to and from module 802 is communicated via a bus 806, or other similar suitable communication coupling. It is noted that module 802 may be implemented by selection controller 110 in FIG. 1, other components in ME 112 such as a DSP, or any other suitable device.

Apparatus 800 further includes a module 808 for selecting a preferred wireless communication system access technology from one of the first group of wireless system access technologies and the second group of wireless system access technologies based on at least the identification information stored in the first search database. Accordingly, module 808 communicates via bus 806 with first database 804 to make the selection. It is noted that module 808 may be implemented by selection controller 110 in FIG. 1, or any other suitable device.

A module 810 is also included for searching a second search database 812 (e.g., PRL) concerning priority of access technologies pertaining to the first group of wireless system access technologies (e.g., 3GPP2) to determine whether the preferred system access technology may be selected from the first group of wireless system access technologies for a current geographic location of the wireless device. As an example of the functionality module 812 effects, reference is made to example of FIG. 7 where the PRL 702 is consulted or searched to determine the preferred 3GPP2 technology in a geographical region. It is noted that module 810 may be implemented by selection controller 110 in FIG. 1, or any other suitable device.

Also, the apparatus 800 may include an optional mapping table 814, which may be in a database or in a memory. A module 816 for consulting the mapping table 814 is also included to determine a second identifier pertaining to the preferred system access technology that may be selected from the first group of wireless system access technologies. It is noted that the mapping table 814 is similar to the mapping tables 500 or 708 described above. It is further noted that module 816 may be implemented by selection controller 110 in FIG. 1, or any other suitable device.

Finally, it is noted that a computer readable medium or memory device 818 configured to store computer readable instructions and data for effecting the processes and behavior of one or more of the other modules in apparatus 800. Additionally, apparatus 800 may include a processor 820 to execute the computer readable instructions in memory 818, and may be configured to execute one or more functions of the various modules in apparatus 800.

As will be appreciated by those skilled in the art, the above-described methods and apparatus assist the multimode devices to select the best available wireless access technology in a geographical location in an efficient manner. Furthermore, the presently disclosed methods and apparatus may assist a home carrier to ensure efficient and consistent system selection experience to its subscribers worldwide, by enabling the carrier to express complex roaming relationships while ensuring backward compatibility by building on existing 3GPP and 3GPP2 system selection mechanisms (i.e., PLMN lists and PRL).

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, means, and steps have been described above generally in terms of their functionality. Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium (not shown) may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. It is noted that the word "exemplary" is used exclusively herein to mean "serving as an example, instance, or illustration." Any example described herein as "exemplary" is not necessarily to be construed as preferred or advantageous over other examples. Accordingly, the novel aspects described herein are to be defined solely by the scope of the following claims.

What is claimed is:

1. A method for selecting a wireless communication system access technology from a plurality of wireless system access technologies supported by a wireless device, the method comprising;
    storing identification information concerning access technologies pertaining to a first group of wireless system access technologies in a first search database that identifies a second group of wireless system access technologies, wherein selected entries of the second group of wireless system access technologies in the first search database are extended to comprise the identification information; and
    selecting a preferred wireless communication system access technology from one of the first group of wireless system access technologies and the second group of wireless system access technologies based on at least the identification information stored in the first search database.

2. The method as defined in claim 1, wherein the first group includes one of 3GPP and 3GPP2 access technologies, and the second group includes the other of 3GPP and 3GPP2 access technologies.

3. The method as defined in claim 1, wherein the first search database includes one of a PRL and a PLMN list.

4. The method as defined in claim 1, wherein the identification information includes at least information concerning whether the first group of wireless system access technologies is supported by the wireless device.

5. The method as defined in claim 4, wherein the identification information further includes information concerning one or more wireless access technologies within the first group of wireless system access technologies supported by the wireless device.

6. The method as defined in claim 1, wherein selecting the wireless communication system access technology further comprises:
    searching a second search database concerning priority of access technologies pertaining to the first group of wireless system access technologies to determine whether the preferred system access technology may be selected from the first group of wireless system access technologies for a current geographic location of the wireless device; and
    selecting the preferred wireless communication system access technology of the first group of wireless system access technologies when the search of the second search database determines that the preferred system access technology may be selected from the first group of wireless system access technologies, where selecting is performed using the first search database based on at least the identification information stored in the first search database.

7. The method as defined in claim 6, further comprising:
    consulting a mapping table that maps first identifiers associated with the first group of wireless system access technologies to second identifiers associated with the second group of wireless system access technologies to determine a second identifier pertaining to the preferred system access technology that may be selected from the first group of wireless system access technologies where the second identifier is usable by the second group of system access technologies associated with the determined preferred system access technology; and selecting the preferred wireless communication system access technology from the first search database further based on the second identifier determined from the consultation of the mapping table.

8. The method as defined in claim 7, wherein the first identifiers include at least one a SID and a NID and the second identifiers include at least one of an MCC and an MNC.

9. The method as defined in claim 6, wherein the first group includes one of SGPP2 and WiMax access technologies, and the second group includes 3GPP access technologies.

10. The method as defined in claim 6, wherein the first search database includes at least one PLMN list and the second search database includes a PRL.

11. An apparatus for selecting a wireless communication system access technology from a plurality of wireless system access technologies supported by a wireless device, the apparatus comprising;
a first search database; and
a selection controller configured to store identification information concerning access technologies pertaining to a first group of wireless system access technologies in the first search database that identifies a second group of wireless system access technologies, wherein selected entries of the second group of wireless system access technologies in the first search database are extended to comprise the identification information; and select a preferred wireless communication system access technology from one of the first group of wireless system access technologies and the second group of wireless system access technologies based on at least the identification information stored in the first search database.

12. The apparatus as defined in claim 11, wherein the first group includes one of 3GPP and 3GPP2 access technologies, and the second group includes the other of 3GPP and 3GPP2 access technologies.

13. The apparatus as defined in claim 11, wherein the first search database includes one of a PRL and a PLMN list.

14. The apparatus as defined in claim 11, wherein the identification information includes at least information concerning whether the first group of wireless system access technologies is supported by the wireless device.

15. The apparatus as defined in claim 14, wherein the identification information further includes information concerning one or more wireless access technologies within the first group of wireless system access technologies supported by the wireless device.

16. The apparatus as defined in claim 11, wherein the selection controller is further configured to: search a second search database concerning priority of access technologies pertaining to the first group of wireless system access technologies to determine whether the preferred system access technology may be selected from the first group of wireless system access technologies for a current geographic location of the wireless device; and select the preferred wireless communication system access technology of the first group of wireless system access technologies when the search of the second search database determines that the preferred system access technology may be selected from the first group of wireless system access technologies, where selection is performed using the first search database based on at least the identification information stored in the first search database.

17. The apparatus as defined in claim 16, wherein the selection controller is further configured to: consult a mapping table that maps first identifiers associated with the first group of wireless system access technologies to second identifiers associated with the second group of wireless system access technologies to determine a second identifier pertaining to the preferred system access technology that may be selected from the first group of wireless system access technologies where the second identifier is usable by the second group of system access technologies associated with the determined preferred system access technology; and select the preferred wireless communication system access technology from the first search database further based on the second identifier determined from the consultation of the mapping table.

18. The apparatus as defined in claim 17, wherein the first identifiers include at least one of a SID and a NID and the second identifiers include at least one of an MCC and an MNC.

19. The apparatus as defined in claim 16, wherein the first group includes one of 3GPP2 and WiMax access technologies, and the second group includes 3GPP access technologies.

20. The apparatus as defined in claim 16, wherein the first search database includes at least one PLMN list and the second search database includes a PRL.

21. An apparatus for selecting a wireless communication system access technology from a plurality of wireless system access technologies supported by a wireless device, the apparatus comprising:
a memory storing instructions executable by at least one processor; and
at least one processor configured to execute the instructions stored in the memory to:
store identification information concerning access technologies pertaining to a first group of wireless system access technologies in a first search database that comprises a second group of wireless system access technologies, wherein selected entries of the second group of wireless system access technologies in the first search database are extended to comprise the identification information; and
select a preferred wireless communication system access technology from one of the first group of wireless system access technologies and the second group of wireless system access technologies based on at least the identification information stored in the first search database.

22. The apparatus as defined in claim 21, wherein the first group includes one of 3GPP and 3GPP2 access technologies, and the second group includes the other of 3GPP and 3GPP2 access technologies.

23. The apparatus as defined in claim 21, wherein the first search database includes one of a PRL and a PLMN list.

24. The apparatus as defined in claim 21, wherein the identification information includes at least information concerning whether the first group of wireless system access technologies is supported by the wireless device.

25. The apparatus as defined in claim 24, wherein the identification information further includes information concerning one or more wireless access technologies within the first group of wireless system access technologies supported by the wireless device.

26. The apparatus as defined in claim 21, wherein the at least one processor is further configured to:
search a second search database concerning priority of access technologies pertaining to the first group of wireless system access technologies to determine whether the preferred system access technology may be selected from the first group of wireless system access technologies for a current geographic location of the wireless device; and select the preferred wireless communication system access technology of the first group of wireless system access technologies when the search of the second search database determines that the preferred system access technology may be selected from the first group of wireless system access technologies, where selection is performed using the first search database based on at least the identification information stored in the first search database.

27. The apparatus as defined in claim 26, wherein the at least one processor is further configured to:

consult a mapping table that maps first identifiers associated with the first group of wireless system access technologies to second identifiers associated with the second group of wireless system access technologies to determine a second identifier pertaining to the preferred system access technology that may be selected from the first group of wireless system access technologies where the second identifier is usable by the second group of system access technologies associated with the determined preferred system access technology; and select the preferred wireless communication system access technology from the first search database further based on the second identifier determined from the consultation of the mapping table.

28. The apparatus as defined in claim 27, wherein the first identifiers include at least one of a SID and a NID and the second identifiers include at least one of an MCC and an MNC.

29. The apparatus as defined in claim 26, wherein the first group includes one of 3GPP2 and WiMax access technologies, and the second group includes 3GPP access technologies.

30. The apparatus as denned in claim 26, wherein the First search database includes at least one PLMN list and the second search database includes a PRL.

31. A computer program product, comprising:
a non-transitory computer-readable medium comprising:
code for causing a computer to store identification information concerning access technologies pertaining to a first group of wireless system access technologies in a first search database that comprises a second group of wireless system access technologies, wherein selected entries of the second group of wireless system access technologies in the first search database are extended to comprise the identification information; and code for causing the computer to select a preferred wireless communication system access technology from one of the first group of wireless system access technologies and the second group of wireless system access technologies based on at least the identification information stored in the first search database.

32. The non-transitory computer-readable medium as defined in claim 31, wherein the first group includes one of 3GPP and 3GPP2 access technologies, and the second group includes the other of 3GPP and 3GPP2 access technologies.

33. The non-transitory computer-readable medium as defined in claim 31, wherein the first search database includes one of a PRL and a PLMN list.

34. The non-transitory computer-readable medium as defined in claim 31, wherein the identification information includes at least information concerning whether the first group of wireless system access technologies is supported by the wireless device.

35. The non-transitory computer-readable medium as defined in claim 34, wherein the identification information further includes information concerning one or more wireless access technologies within the first group of wireless system access technologies supported by the wireless device.

36. The non-transitory computer-readable medium as defined in claim 31, wherein the non-transitory computer-readable medium further comprises:

code for causing the computer to search a second search database concerning priority of access technologies pertaining to the first group of wireless system access technologies to determine whether the preferred system access technology may be selected from the first group of wireless system access technologies for a current geographic location of the wireless device; and code for causing the computer to select the preferred wireless communication system access technology of the first group of wireless system access technologies when the search of the second search database determines that the preferred system access technology may be selected from the first group of wireless system access technologies, where selection is performed using the first search database based on at least the identification information stored in the first search database.

37. The non-transitory computer-readable medium as defined in claim 36, wherein the computer-readable medium further comprises:

code for causing the computer to consult a mapping table that maps first identifiers associated with the first group of wireless system access technologies to second identifiers associated with the second group of wireless system access technologies to determine a second identifier pertaining to the preferred system access technology that may be selected from the first group of wireless system access technologies where the second identifier is usable by the second group of system access technologies associated with the determined preferred system access technology; and code for causing the computer to select the preferred wireless communication system access technology from the first search database further based on the second identifier determined from the consultation of the mapping table.

38. The non-transitory computer-readable medium as defined in claim 37, wherein the first identifiers include at least one a SID and a NID and the second identifiers include at least one of an MCC and an MNC.

39. The non-transitory computer-readable medium as defined in claim 36, wherein the first group includes one of 3GPP2 and WiMax access technologies, and the second group includes 3GPP access technologies.

40. The non-transitory computer-readable medium as defined in claim 36, wherein the first search database includes at least one PLMN list and the second search database includes a PRL.

41. An apparatus for selecting a wireless communication system access technology from a plurality of wireless system access technologies supported by a wireless device, the apparatus comprising:

means for storing identification information concerning access technologies pertaining to a first group of wireless system access technologies in a first search database that comprises a second group of wireless system access technologies, wherein selected entries of the second group of wireless system access technologies in the first search database are extended to comprise the identification information; and means for selecting a preferred wireless communication system access technology from one of the first group of wireless system access technologies and the second group of wireless system access technologies based on at least the identification information stored in the first search database.

42. The apparatus as defined in claim 41, wherein the first group includes one of 3GPP and 3GPP2 access technologies, and the second group includes the other of 3GPP and 3GPP2 access technologies.

43. The apparatus as defined in claim 41, wherein the first search database includes one of a PRL and a PLMN list.

44. The apparatus as defined in claim 41, wherein the identification information includes at least information concerning whether the first group of wireless system access technologies is supported by the wireless device.

45. The apparatus as defined in claim 44, wherein the identification information further includes information concerning one or more wireless access technologies within the first group of wireless system access technologies supported by the wireless device.

46. The apparatus as defined in claim 41, further comprising:
  means for searching a second search database concerning priority of access technologies pertaining to the first group of wireless system access technologies to determine whether the preferred system access technology may be selected from the first group of wireless system access technologies for a current geographic location of the wireless device; and
  means for selecting the preferred wireless communication system access technology of the first group of wireless system access technologies when the search of the second search database determines that the preferred system access technology may be selected from the first group of wireless system access technologies, where selecting is performed using the first search database based on at least the identification information stored in the first search database.

47. The apparatus as defined in claim 46, further comprising:
  means for consulting a mapping table that maps first identifiers associated with the first group of wireless system access technologies to second identifiers associated with the second group of wireless system access technologies to determine a second identifier pertaining to the preferred system access technology that may be selected from the first group of wireless system access technologies where the second identifier is usable by the second group of system access technologies associated with the determined preferred system access technology; and
  means for selecting the preferred wireless communication system access technology from the first search database further based on the second identifier determined from the consultation of the mapping table.

48. The apparatus as defined in claim 47, wherein the first identifiers include at least one of a SID and a NID and the second identifiers include at least one of an MCC and an MNC.

49. The apparatus as defined in claim 46, wherein the first group includes one of 3GPP2 and WiMax access technologies, and the second group includes 3GPP access technologies.

50. The apparatus as defined in claim 46, wherein the first search database includes at least one PLMN list and the second search database includes a PRL.

* * * * *